(12) United States Patent
Fourre et al.

(10) Patent No.: US 12,424,020 B2
(45) Date of Patent: Sep. 23, 2025

(54) CONTACTLESS BIOMETRIC ACQUISITION SENSOR AND METHOD

(71) Applicant: IDEMIA IDENTITY & SECURITY FRANCE, Courbevoie (FR)

(72) Inventors: Joël-Yann Fourre, Courbevoie (FR); Alexis Sireta, Courbevoie (FR); Jean Beaudet, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 122 days.

(21) Appl. No.: 18/565,119

(22) PCT Filed: May 19, 2022

(86) PCT No.: PCT/EP2022/063660
§ 371 (c)(1),
(2) Date: Nov. 29, 2023

(87) PCT Pub. No.: WO2022/253587
PCT Pub. Date: Dec. 8, 2022

(65) Prior Publication Data
US 2024/0371195 A1 Nov. 7, 2024

(30) Foreign Application Priority Data

Jun. 2, 2021 (FR) ..................................... 21 05814

(51) Int. Cl.
*G06V 40/13* (2022.01)
*G06V 40/12* (2022.01)
(52) U.S. Cl.
CPC ...... *G06V 40/1312* (2022.01); *G06V 40/1376* (2022.01); *G06V 40/1388* (2022.01)

(58) Field of Classification Search
CPC .......... G06V 40/1312; G06V 40/1376; G06V 40/1388; G06V 40/1324; G06V 40/1365; G06V 40/1382
See application file for complete search history.

(56) References Cited

U.S. PATENT DOCUMENTS 8,224,064 B1 * 7/2012 Hassebrook ......... G06V 10/145
356/3
2009/0208070 A1 * 8/2009 Fourre ............... G06V 40/1312
382/124

(Continued)

FOREIGN PATENT DOCUMENTS

EP 3 312 771 A1 4/2018

OTHER PUBLICATIONS

International Search Report and Written Opinion issued Aug. 2, 2022 in PCT/EP2022/063660 filed on May 19, 2022 citing documents 1, 15 therein, 10 pages (with English Translation).

(Continued)

*Primary Examiner* — Abhishek Sarma
(74) *Attorney, Agent, or Firm* — Oblon, McClelland, Maier &Neustadt, L.L.P.

(57) ABSTRACT

A contactless biometric sensor, including an upper face above which, in use, a human body part which has dermatoglyphs is positioned, a lighting source configured to light the human body part through the upper face and an imager configured to acquire an image of the human body part through the upper face. The upper face of the sensor is provided with a mask having spatially variable light transmissivity.

15 Claims, 2 Drawing Sheets

(56) References Cited

U.S. PATENT DOCUMENTS

2012/0086794 A1* 4/2012 Burcham ................ H04N 7/18
348/E7.085
2018/0330142 A1 11/2018 Trouboul

OTHER PUBLICATIONS

French Preliminary Search Report issued Feb. 10, 2022 in French Application 21 05814 filed on Jun. 2, 2021 citing documents 1, 15 therein, 8 pages.

* cited by examiner

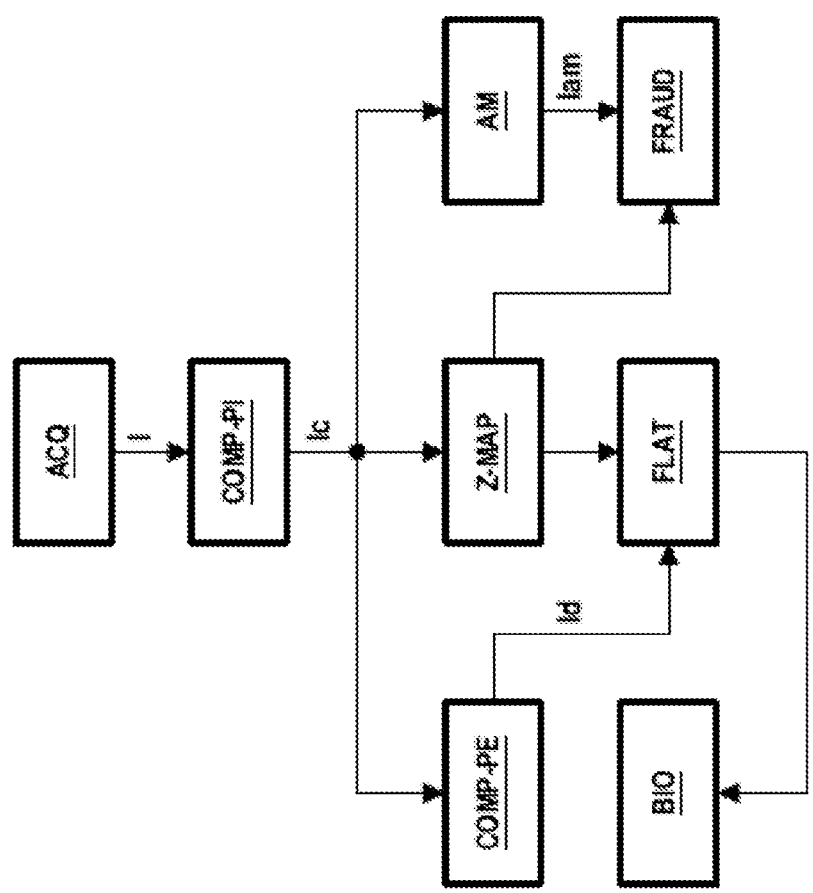

CONTACTLESS BIOMETRIC ACQUISITION SENSOR AND METHOD

TECHNICAL FIELD

The field of the invention is that of devices and methods for biometric acquisition and processing of an image of a human body part which has dermatoglyphs. The invention relates more particularly to the contactless acquisition of such an image with the human body part being positioned above a sensor.

PRIOR ART

The MorphoWave™ biometric reader is a 3D fingerprint reader for use in controlling access to a secured zone via a single, contactless passage of the hand above the reader. This reader, which is based on a patented technology in particular via patent EP 3 312 771 B1, uses a system of uniform lighting in one color and a system of projecting a test pattern made up of repetitive light patterns in at least one other color.

DISCLOSURE OF THE INVENTION

One objective of the invention is to propose a biometric reader that is less complex in design, in particular to reduce its cost, without degrading its performance.

For this purpose, the invention proposes according to a first aspect a contactless biometric sensor, comprising:
  an upper face above which, in use, a human body part which has dermatoglyphs is positioned;
  a lighting source configured to light said human body part through the upper face; and
  an imager configured to acquire an image of said human body part through the upper face.

The upper face is provided with a mask having spatially variable light transmissivity. In use, the mask introduces onto said human body part a projection, referred to as lighting projection, of a test pattern having a spatial modulation of light intensity. The mask also introduces a projection, referred to as imaging projection, of said test pattern into the image acquired by the imager.

Some preferred but non-limiting aspects of this sensor are:
  the mask consists of the upper face on which an opacity pattern is made;
  the mask consists of a transparent substrate on which an opacity pattern is made, said substrate being applied onto the upper face;
  the spatially variable light transmissivity of the mask has a periodic modulation along a main direction;
  the periodic modulation is a sinusoidal modulation or a triangular modulation.

The invention also relates to a biometric measurement device comprising a sensor according to the first aspect of the invention and a unit for processing the image acquired by the imager. The processing unit is configured to compensate for the imaging projection of said test pattern in the image acquired by the imager, in order to provide a compensated image corresponding to the light reflected by said human body part exposed to the lighting projection.

The processing unit may further be configured to compensate for the lighting projection of said test pattern in the compensated image, in order to provide an image of the dermatoglyphs.

The processing unit may further be configured to derive from the compensated image a depth map representative of the geometry of the dermatoglyphs.

The processing unit may further be configured to straighten the image of the dermatoglyphs using the depth map, in order to provide a flattened image of the dermatoglyphs.

The processing unit may further be configured to implement a biometric identity recognition method based on the image of the dermatoglyphs or based on the flattened image of the dermatoglyphs.

The processing unit may further be configured to derive from the compensated image an amplitude image of the modulation introduced by the lighting projection.

The processing unit may further be configured to implement, based on said amplitude image, a fraud-detection method intended to authenticate that the human body part is an authentic human body part.

BRIEF DESCRIPTION OF THE DRAWINGS

Other aspects, purposes, advantages and features of the invention will become more apparent from reading the following detailed description of preferred embodiments thereof, given by way of non-limiting example, and made with reference to the attached drawings in which:

FIG. 2 is a diagram schematically illustrating steps performed when executing a biometric measurement method according to one possible embodiment of the invention.

DETAILED DISCLOSURE OF PARTICULAR EMBODIMENTS

Figure 1:
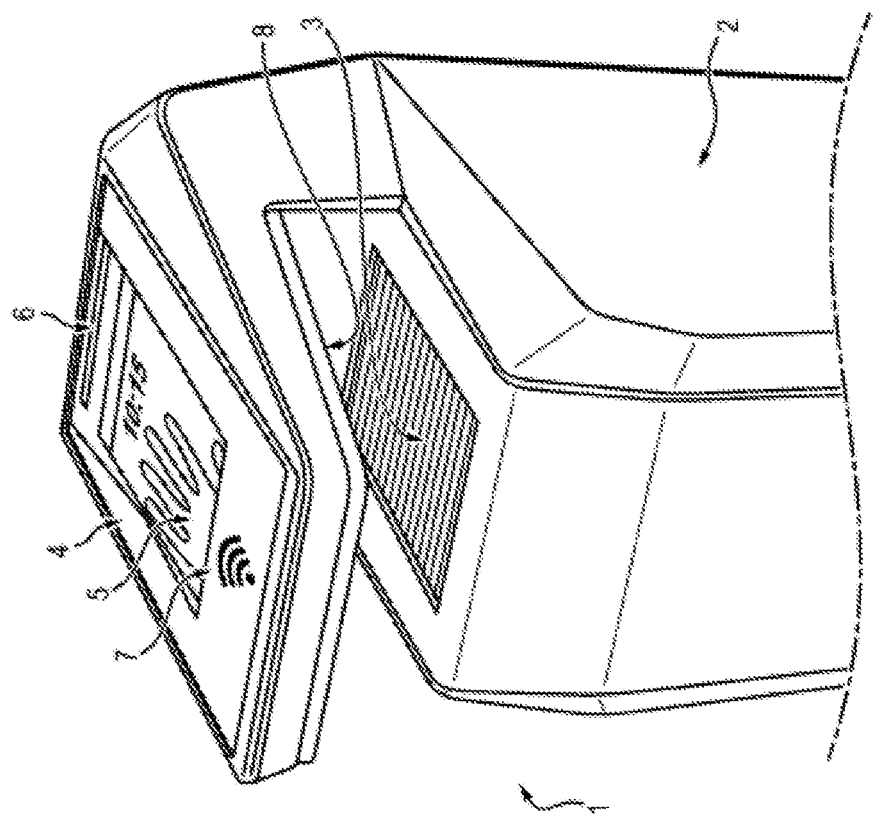
FIG. 1 is a diagram of a contactless biometric sensor according to one possible embodiment of the invention.

The invention relates to a contactless biometric sensor of which one example of embodiment is shown in FIG. 1. In this example, the sensor 1 comprises a console 2 provided with an upper face 3 above which, in use, a human body part which has dermatoglyphs is positioned. The human body part can be positioned dynamically, passing said human body part above the upper face 3 following a scanning motion (acquisition in motion) or conversely in a static manner above the upper face 3 (static acquisition).

The upper face may optionally be topped with a cap 4. The upper face and the cap 4 are separated by a few centimeters in order to define between them an acquisition zone, herein open to the front and the sides, forming a passage for a user's hand.

The cap 4 can integrate a screen 5, for example a touch screen, intended in particular to indicate to the user how to position their hand. The cap 4 may further comprise a chaser 6 consisting of light-emitting diodes arranged in a line and programmed to successively light up the diodes at a desired speed for the movement of the hand.

The cap 4 may further integrate a contactless access card reader 7 allowing for multi-factor authentication.

The console 2 houses a lighting source configured to light said human body part through the upper face 3 and an imager configured to acquire an image of said human body part through the upper face 3. The imager is placed generally vertically to the upper face 3 while the lighting source is inclined with respect to the imager so that the lighting direction and the imaging direction form an angle between them preferentially greater than 10°, even more preferentially greater than 20°.

The console 2 may further include a sensor 8, for example an infrared barrier, making it possible to detect the entry of the hand into the acquisition zone and control the activation of the lighting source and the imager.

The lighting source is configured to provide uniform lighting of the upper face 3 in a single color, visible or not (for example in the infrared). The lighting source can thus comprise a single light-emitting diode associated with an optical part that serves to control the divergence of the lighting beam and to direct it towards the acquisition zone. Thus, unlike the lighting source of patent EP 3 312 771 B1, the lighting source of the sensor according to the invention uses a single lighting color and does not incorporate a system for projecting a test pattern. The cost of the sensor is therefore reduced, while maintaining its performance since the amount of light collected by the imager is only slightly altered due to its absorption by the mask.

According to the invention, the upper face 3 of the sensor 1 is provided with a mask having spatially variable light transmissivity. Since this mask is present in the lighting path, it introduces, in use, onto the human body part present in the acquisition zone, a projection, referred to as lighting projection, of a test pattern having a spatial modulation of light intensity. Moreover, this mask is also present in the imaging path (the imager looks at the human body part through the mask) and thus also introduces a projection, referred to as imaging projection, of said test pattern into the image acquired by the imager.

The imager may be a color camera or, preferably, a black and white camera that is more sensitive than a color camera and thus able to compensate for the alteration related to the absorption of light by the mask.

In one possible embodiment, the sensor includes a marker on the periphery of the mask, the position of which can be controlled in each image acquired by the imager in order to compensate for possible drifts of the material, such as expansion due to temperature. This ensures that the imaging projection correction described below is always optimal. Optionally, the mask position can be used to compensate for distance information based on learning from the drifts. In the presence of a cap 4, the screen 5 can be used to display a control image of the mask and thus make it possible to note, and correct, any mechanical drift.

The upper face 3 is typically transparent and the mask can consist of the upper face 3 on which an opacity pattern is made. Alternatively, the mask can consist of a transparent substrate on which an opacity pattern is made, said substrate being applied onto the upper face. By way of examples, the opacity pattern may be made with an opaque screened element (for example chromium on glass or black screen-printed or inkjet-printed ink) or by a variable-density element (for example gelatin, dye sublimation ink).

The opacity pattern has a spatially variable light transmissivity such that in the most transparent areas more than 90% of the incident light is preferably transmitted while in the least transparent areas at least 30% (more preferably at least 50% and even more preferentially at least 70%) of the incident light is preferably transmitted. In particular, the opacity pattern has no completely opaque areas to avoid occluding the imaging system. The modulation rate (ratio between the maximum and minimum transmission) of the opacity pattern can be less than 50%, or even less than 30%. The minimum transmission and the maximum transmission are considered on an area corresponding to the optical resolution of the imaging system at the mask level, the opacity pattern not producing a completely black spot in the image acquired by the imager.

In a preferred embodiment, the opacity pattern exhibits a periodic modulation of its light transmissivity along a main direction. In particular, the opacity pattern can be invariant along a first direction x (for example along a direction of motion of the hand in the acquisition zone) and correspond to a periodic function along a second direction y orthogonal to the first direction x.

The periodic modulation can especially be a sinusoidal modulation or a triangular modulation.

The periodic modulation of the light transmissivity of the mask can thus be for example of the form $$T(y) = a + b.\cos\left(\frac{2\pi.y}{p} + \phi\right),$$

wherein T(y) is transmission as a function of y, a and b are two constants such that a−b>0.3 (preferably greater than 0.5, even more preferably greater than 0.7) and a+b<=1, p the period, and ϕ a constant. The period of the mask is preferably chosen to be larger than that of the dermatoglyphs (350 to 700 μm), for example between 3 and 5 mm.

To simplify the recognition of the test pattern and to eliminate the risk of confusion between two periods, it is possible to add an amplitude modulation b(y) (the coefficient b being for example different for each period), a frequency modulation p(y) and/or a phase modulation ϕ(y), wherein p(y) and/or ϕ(y) are a function of y (either a continuous function, or a function that is constant in each period and discontinuous between the periods).

For reasons of simplicity of manufacture, a triangular function can be used instead of the sine, for example. A rectangular function should be avoided because it has too much energy at higher frequencies and can disrupt the extraction of the dermatoglyphs.

The invention also relates to a biometric measurement device comprising a contactless sensor as previously described as well as a unit for processing the image acquired by the imager. The processing unit can be integrated directly into the sensor or be external to the sensor. It can be embedded in the console or take the form of a remote unit connected to the sensor by a communication network, for example wireless. It can also be composed of different parts, and different parts of the method described hereunder can be implemented by different parts of the processing unit, which can be remote from one another and communicate with one another through a communication network.

In reference to FIG. 2, following the acquisition of an image I by the imager during a step ACQ, the processing unit is configured to compensate (during a step COMP-PI) for the imaging projection of the test pattern in the image acquired by the imager, in order to provide a compensated image Ic corresponding to the light reflected by said human body part exposed to the lighting projection. This step COMP-PI makes it possible to correct the fact that the test pattern is present in the imaging path and hence to apply conventional biometric image processing functions using the compensated image, such as those presented in patent EP 3 312 771 B1, in application EP 3 726 423 A1 or in the article "*Système complet de reconstruction 2.5D d'empreintes digitales: une étude de faisabilité*" (Complete 2.5D fingerprint reconstruction system: a feasibility study) by Laurent Condat and Vincent Roullier (RFIA 2012— Reconnaissance des Formes et Intelligence Artificielle, January 2012, Lyon, France, pages 978-2-9539515-2-3, hal-00656576).

Considering (u,v) to be the coordinates of a pixel in the acquired image and I(u,v) the intensity measured at a pixel of the acquired image, this COMP-PI compensation can comprise applying a predetermined correction function so that the intensity at a pixel of the compensated image Ic(u,v) can be expressed according to Ic(u,v)=(I(u,v)−offset(y))*G/T(y), wherein G is a constant, T(y) the transmissivity of the test pattern at a point y corresponding to the pixel (u,v) and offset(y) an offset function which can be optionally introduced to take into account the scattering of the light by the mask.

In one possible embodiment, the correction function may be predetermined by knowing the opacity pattern and its projection in the acquired image. Alternatively, the correction function may be predetermined during a calibration phase using a uniform reflectance calibration test pattern affixed directly to the mask on the upper face of the sensor. For example, it is possible to acquire a first image with a uniformly bright calibration test pattern and a second image with a uniformly dark calibration test pattern which makes it possible to calculate gain coefficients g(u,v) and offset coefficients o(u,v) such that after correcting the imaging projection each of the first and second images of the calibration test patterns is aligned with the lighting projection:

$$\begin{cases} I_c(u,v) = G\dfrac{I(u,v) - o(u,v)}{T(u,v)} \\ I_{c(u,v)} = \alpha T(u,v) \end{cases}$$

This second approach has the advantage of compensating for all the other defects (vignetting for example) associated with the optical system (uniformity of lighting in particular) and/or with the production of the mask.

Still referring to FIG. 2, the processing unit may further be configured to compensate during a step COMP-PE for the lighting projection of said test pattern in the compensated image, in order to provide an image of the dermatoglyphs Id. Such a compensation can for example be performed by means of a band-stop filter, typically a filter centered around the spatial frequency of the test pattern (e.g. 3 mm) and whose bandwidth is adapted so that the filter does not alter the dermatoglyphs (for example a bandwidth of about 1 mm).

The processing unit may further be configured to, during a step Z-MAP, derive from the compensated image a depth map representative of the geometry of the dermatoglyphs. To do this, each point of the compensated image can be mapped to the y-coordinate of the opacity pattern, making it possible by triangulation to calculate the distance between the imager and the human body part positioned in the acquisition zone. The depth map can be computed by phase calculation, for example in the Fourier plane, by Gabor filters or by solutions based on deep learning. When the opacity pattern is periodic, the mapping is within one period. This ambiguity can nevertheless be resolved by using geometric considerations (for example an a priori on the distance, since the acquisition zone can be bounded between the upper face 3 and the cap 4). It is also possible to use a non-periodic opacity pattern (for example, a sinusoid to which an amplitude and/or phase modulation is added) or to use a single marker (an edge of the pattern for example). It is also possible to implement a technique based on the apparent frequency of the opacity pattern (when the lighting and the optical center of the imager are not at the same distance from the plane containing the pattern) or on demodulation (since the pattern becomes more blurred as one moves away from it). The width of the finger or a secondary distance sensor can also be used. Finally, an arbitrary choice can be made, resulting approximately in a simple scale error on the finger that can be tolerated by the comparison algorithms.

As shown by FIG. 2, the processing unit may further be configured to, during a step FLAT, straighten the image of the dermatoglyphs Id using the depth map, in order to provide a flattened image of the dermatoglyphs. This step FLAT can be carried out in accordance with the teaching of patent EP 3 312 771 B1 or even by means of a deep-learning solution.

The processing unit may further be configured to implement, during a step BIO, a biometric identity recognition method based on the image of the dermatoglyphs Id or, as shown in FIG. 2, based on the flattened image of the dermatoglyphs.

In a possible embodiment using, for example, the teaching of EP 3 726 423 A1, the processing unit is further configured to, during a step AM, derive from the compensated image Ic an amplitude image Iam of the modulation introduced by the lighting projection.

This amplitude image Iam may be used to help identify the borders of the opacity pattern in the case of an amplitude modulation thereof. Furthermore, on the basis of said amplitude image Iam, the processing unit can, during a step FRAUD, implement a fraud-detection method aimed at authenticating that the human body part is an authentic human body part. This step may include comparing the amplitude image with a depth-dependent interval as determined by the depth map and determining that the finger is authentic or counterfeit based on the proportion of points within this interval.

It should be noted that for fraud detection, it may be advantageous to compensate for the blurring of the projection of the test pattern on the finger. In the case of an approximately sinusoidal pattern, this can be done by correcting the modulation amplitude image Iam based on a knowledge of the modulation amplitude of the pattern for a given distance. This knowledge can be derived from a calibration (comprising the acquisition of images of a planar uniform object at different distances from the upper face of the sensor to calculate the amplitude of the test pattern) or a calculation (using the distance between the test pattern on the finger and a parameter corresponding to the angular aperture of the lighting).

In the foregoing, monochromatic lighting and a mask have been described. However, the invention also extends to a mask with a color variation which, although it may be more expensive to manufacture, has the advantage of offering better image quality and allowing the use of higher frequencies leading to a better 3D reconstruction. An example of such a mask is the superimposing of three sinusoidal patterns with a 120° phase shift (one in cyan, another in magenta and the third in yellow) or two green and blue patterns in phase opposition. Assuming the color of the finger is uniform and the scattering of the finger in green and blue is similar, in the case of the blue and green lighting, the image of the texture of the dermatoglyphs is obtained by simple addition (weighted) of the blue and green images ($I'=aI_v+bI_b$), as well as an image with maximum modulation amplitude as a difference (with the same weighting) of these two images ($I'=aI_v-bI_b$). This last image is used to extract the phase (step Z-MAP) and the amplitude (step AM).

The invention claimed is:

1. A contactless biometric sensor, comprising:
   an upper face above which, in use, a human body part which has dermatoglyphs is positioned;
   a lighting source configured to light said human body part through the upper face; and
   an imager configured to acquire an image of said human body part through the upper face, wherein
   the upper face is provided with a mask having spatially variable light transmissivity, said mask, in use, introducing onto said human body part a projection, referred to as lighting projection, of a test pattern having a spatial modulation of light intensity, said mask also introducing a projection, referred to as imaging projection, of said pattern into the image acquired by the imager.

2. The sensor according to claim 1, wherein the mask consists of the upper face on which an opacity pattern is made.

3. The sensor according to claim 1, wherein the mask consists of a transparent substrate on which an opacity pattern is made, said substrate being applied onto the upper face.

4. The sensor according to claim 1, wherein the spatially variable light transmissivity of the mask has a periodic modulation along a main direction.

5. The sensor according to claim 4, wherein the periodic modulation is a sinusoidal modulation or a triangular modulation.

6. A biometric measurement device comprising:
   the sensor according to claim 1; and
   a processing unit configured to process the image acquired by the imager, the processing unit being configured to compensate for the imaging projection of said test pattern in the image acquired by the imager, in order to provide a compensated image corresponding to the light reflected by said human body part exposed to the lighting projection.

7. The biometric measurement device according to claim 6, wherein the processing unit is further configured to compensate for the lighting projection of said test pattern in the compensated image, in order to provide an image of the dermatoglyphs.

8. The biometric measurement device according to claim 7, wherein the processing unit is further configured to implement a biometric identity recognition method based on the image of the dermatoglyphs.

9. The biometric measurement device according to claim 7, wherein the processing unit is further configured to derive from the compensated image a depth map representing a geometry of the dermatoglyphs.

10. The biometric measurement device according to claim 9, wherein the processing unit is further configured to straighten the image of the dermatoglyphs by means of the depth map, in order to provide a flattened image of the dermatoglyphs.

11. The biometric measurement device according to claim 10, wherein the processing unit is further configured to implement a biometric identity recognition method based on the flattened image of the dermatoglyphs.

12. The biometric measurement device according to claim 6, wherein the processing unit is further configured to derive from the compensated image an amplitude image of the modulation introduced by the lighting projection.

13. The biometric measurement device according to claim 12, wherein the processing unit is further configured to implement, based on said amplitude image, a fraud-detection method intended to authenticate that the human body part is an authentic human body part.

14. A biometric measurement method by means of a device according to claim 6, comprising the steps of:
    acquiring by the imager an image of a human body part positioned above the upper face of the sensor; and
    processing the image acquired by the processing unit of said device.

15. A non-transitory computer program product comprising instructions which, when the program is executed by a computer, cause the computer to implement the processing step of the method according to claim 14.

* * * * *